Oct. 23, 1928.  S. R. W. M. BAGER  1,688,572
STEERING MECHANISM
Original Filed May 2, 1923    2 Sheets-Sheet 1
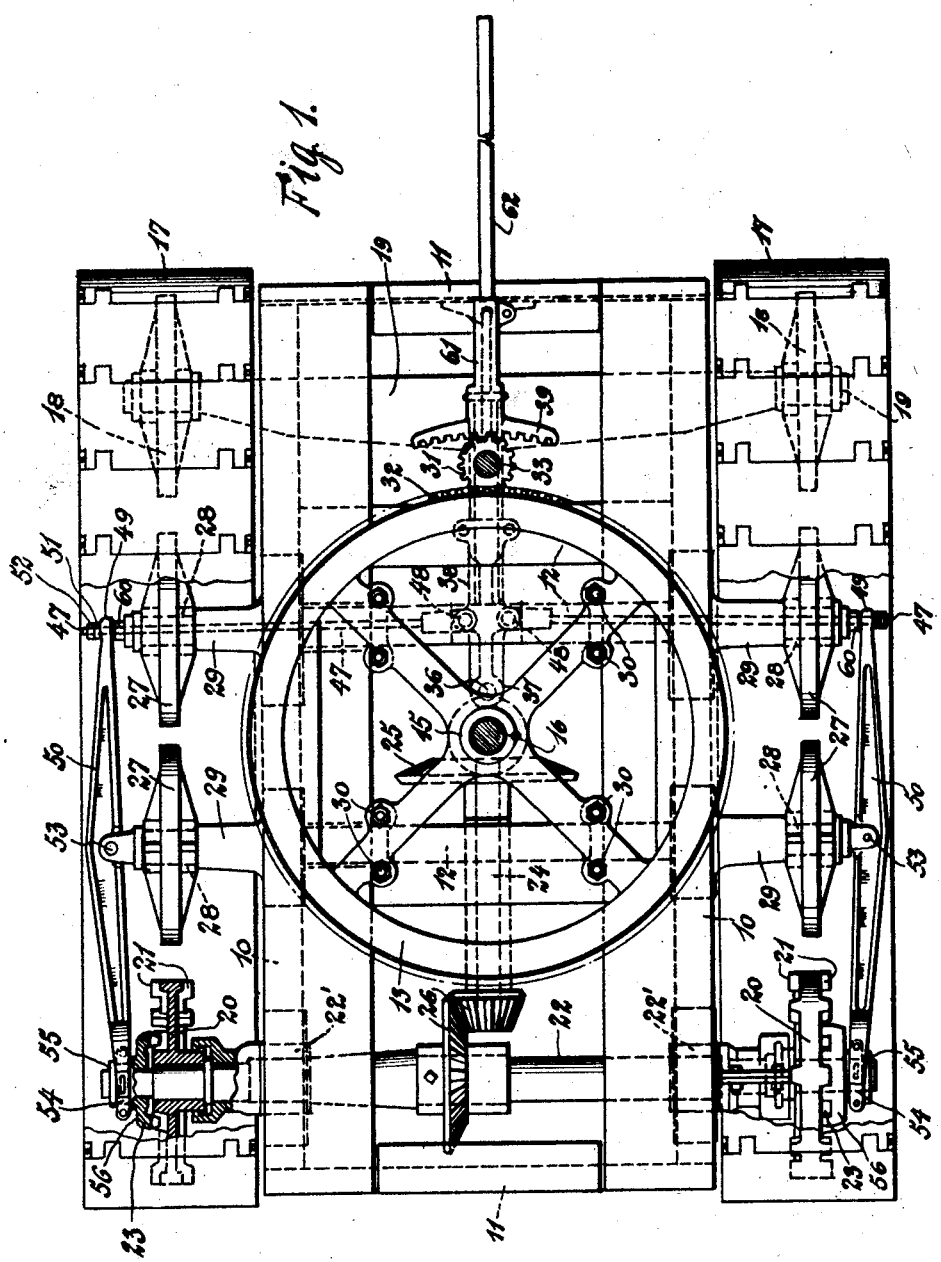
Svante R.W.M. Bager.
INVENTOR.
BY Hoar & Ruhloff
ATTORNEYS.

Oct. 23, 1928.
S. R. W. M. BAGER
STEERING MECHANISM
Original Filed May 2, 1923   2 Sheets-Sheet 2
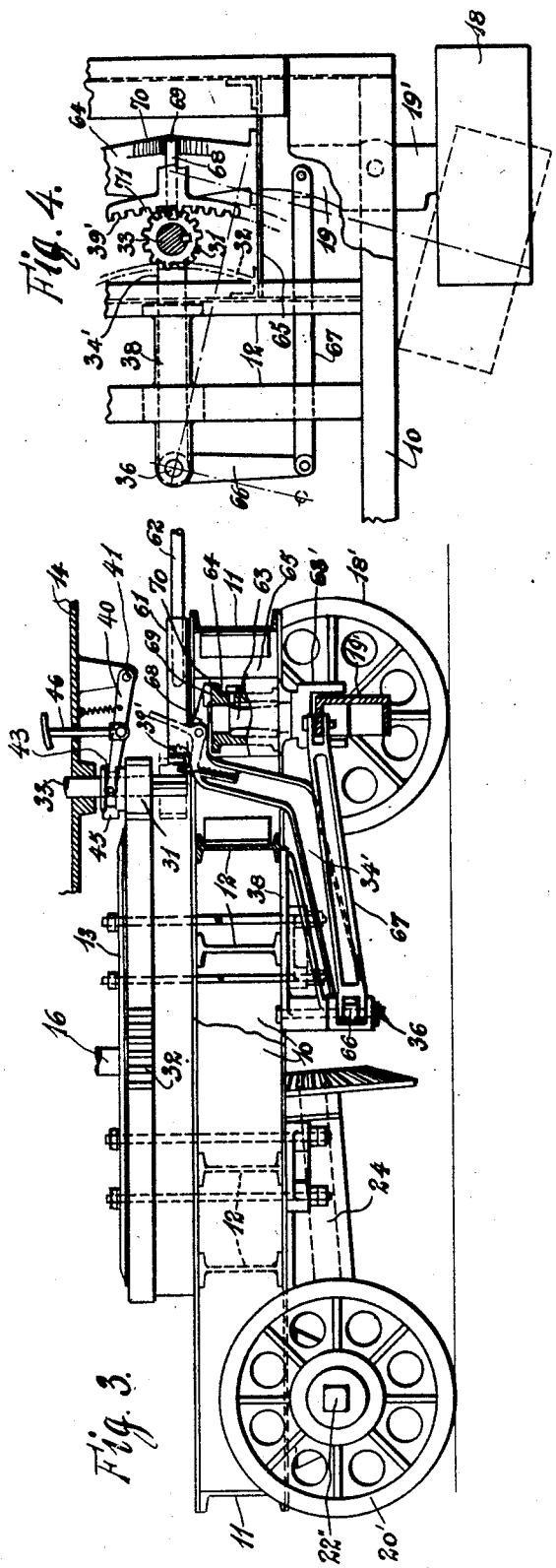
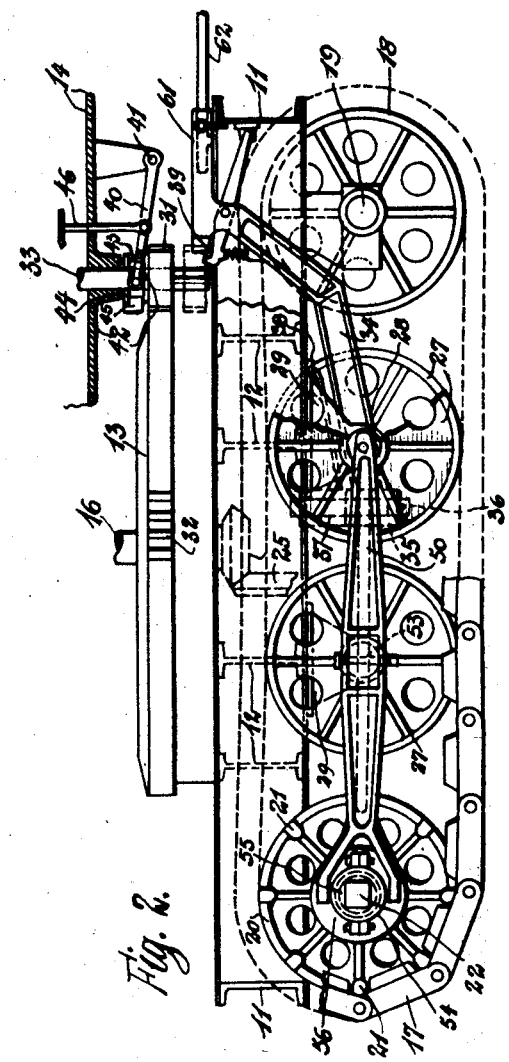
Svante R.W.M. Bager.
INVENTOR.
BY Hoar + Ruhloff
ATTORNEYS.

Patented Oct. 23, 1928.

1,688,572

UNITED STATES PATENT OFFICE.

SVANTE R. W. M. BAGER, OF SOUTH MILWAUKEE, WISCONSIN, ASSIGNOR TO BUCYRUS-ERIE COMPANY, OF SOUTH MILWAUKEE, WISCONSIN, A CORPORATION OF DELAWARE.

STEERING MECHANISM.

Original application filed May 2, 1923, Serial No. 636,137. Divided and this application filed August 13, 1926. Serial No. 128,984.

This case is a division of my copending application, Serial No. 636,137, filed on May 2, 1923, which contains generic claims covering both the showing of this present application and the showing of the parent case; also claims covering the outside clutch-lever feature shown in Figures 1 and 2 of the present case.

This invention relates to steering mechanism for power excavators, cranes and the like, in which the upper or head frame, carrying the operating parts, is revolvable with respect to the base or truck frame.

In machines of this character, direct connections have heretofore been employed between the head frame and steering axle, in the case of wheel traction, or between the head frame and appropriate clutches on the driving shaft, in the case of creeping traction, so that steering movements are dependent upon and responsive to actual rotation of the head frame.

The general aim of the present invention is the provision of steering mechanism which is not dependent for its operation upon the rotation of the head frame, but in which steering is effected rather by the selective application of power derived from the mechanism ordinarily employed for rotating the frame.

A more specific object is the provision of steering mechanism which may be made to respond to rotation of the swing pinion ordinarily employed as part of the head frame rotating mechanism, without rotating the head frame.

Other objects and advantages will appear from the following description of several illustrative embodiments of the invention.

In the drawings:

Figure 1 is a plan view of the truck frame of a power excavator equipped with a steering mechanism constructed in accordance with the present invention.

Figure 2 is a view in side elevation, partly in section, of the machine shown in Figure 1.

Figure 3 is a side elevation, partly in section, illustrating a wheeled truck frame equipped with a steering mechanism, embodying features of the present invention.

Figure 4 is a plan view of the steering mechanism shown in Figure 3.

Figure 5 is a vertical sectional view of a portion of one of the bearing roller supports.

A steering mechanism constructed in accordance with the present invention will first be described as embodied in a power excavator of the creeping traction type. The base or truck frame of a machine of that type is illustrated in Figures 1 and 2. This frame is of substantially the same construction as that fully described in U. S. Patent No. 1,574,041 of S. R. W. M. Bager and Werner Lehman. It comprises a pair of longitudinal side sills 10 rigidly connected with a pair of end bars 11 and a series of transverse intermediate bars 12. The intermediate bars 12 and longitudinal sills 10 constitute a support for a rigid casting 13 in the form of a combined rack and track member for rotatably supporting the head frame 14. The casting 13 is provided with a central hub 15 through which the usual vertical propulsion shaft 16 extends and about the axis of which the head frame is permitted to revolve.

The truck frame is supported upon two sets of rollers respectively disposed beyond the sides of the frame, each set being disposed to travel upon an endless tread belt 17 trained thereabout. The front rollers 18 are journaled upon the ends of an axle 19 fixed to and beneath the longitudinal sills 10. The axle 19 may, if desired, be rendered adjustable fore-and-aft in any convenient manner, to take up the slack in the endless tread belt. The rear rollers 20 are provided with belt engaging lugs 21 and are driven from the rear axle shaft 22, on which they are mounted, through clutches 23 to be hereinafter described. The shaft 22 is journaled in bearings 22' secured to and beneath the sills 10 and is driven from the vertical propulsion shaft 16 through the usual intermediate shaft 24 and bevel gear sets 25 and 26. Each of the intermediate rollers 27 is journaled upon the end of a separate stub shaft 28 constituting part of a bracket arm 29 secured intermediate its ends to and beneath a longitudinal sill 10 and fixed at its inner end beneath a transverse bar 12 to tie-bolts 30 extending downwardly from the casting 13 and embracing the bar 12. The forward pair of bracket arms 29 are preferably hollow for a purpose which will hereinafter appear.

The head frame 14 is rotated about the axis of the shaft 16 by means of a pinion 31 which normally meshes with a fixed rack 32 extending about the periphery of the casting 13. Pinion 31 is carried by and driven from a vertical shaft 33 journaled in the head frame and actuated by the usual mechanism (not shown) carried by the frame. In this instance, the pinion 31 is splined to the shaft 33, so as to permit lowering of the pinion out of mesh with the fixed rack 32. It will be noted that the plane of the rack 32 is sufficiently elevated above the truck frame to provide the necessary clearance between the extended lower end of the pinion shaft 33 and truck frame, as the head frame revolves.

The steering mechanism shown comprises a lever 34 mounted at one end 35 upon a vertical pivot pin 36 so as to swing in a horizontal plane about an axis adjacent the pivotal axis of the head frame. Pin 36 is removably fixed in a boss 37 formed on the rear end of a bracket plate 38, secured to and beneath the forward pair of intermediate transverse bars 12. The lever 34 extends forwardly and upwardly above the truck frame to a point in advance of the casting 13 and at its upper end is provided with a segmental rack 39 below the plane of the fixed rack 32 so as to mesh with the swing pinion 31 when lowered out of mesh with the fixed rack.

It will thus be noted that when the pinion 31 is in its normal upper position in mesh with the rack 32, rotation thereof will cause rotation of the head frame 14 in the usual manner. When shifted downwardly along the shaft 33 out of mesh with rack 32 and into mesh with segmental rack 39 rotation of this pinion will cause the lever 34 to swing laterally in one direction or the other from its normal neutral position along the central longitudinal axis of the truck frame.

The position of elevation of the pinion 31 may be determined by any appropriate means under control of the operator. In the machine shown, this means comprises a lever 40 hinged at one end upon a horizontal pivot 41 carried by the head frame and provided with a bifurcated portion 42 having the usual pins in rotative engagement with an annular groove 43 formed in a collar 44 fixed to the pinion. This lever 40 also preferably carries a finger 45 engageable between the teeth of the rack 32 when the pinion is lowered, so as to lock the head frame against rotation when the pinion is disengaged from the rack 32. A link 46 connected with the lever 40 and extending upwardly through the floor of the head frame into convenient reach of the operator may be employed for adjusting the lever 40.

A pair of pull rods 47, each extending through one of the hollow bracket arms 29, are connected at their inner ends 48 to the opposite sides of the lever 34. Each rod 47 extends loosely through an eye 49 in the forward end of a lever 50 and at its free end is provided with a nut 51 and locknut 52 adapted to bear against this end of lever 50 when the rod is drawn inwardly by lever 34. Each of the levers 50 is mounted intermediate its end upon a vertical pivot 53 carried by the outer end of one of the rearward pair of stub shafts 28. The rear end of each lever 50 is pivotally connected with a collar 54 rotatably fixed upon a sleeve 55 forming a part of a clutch element 56, splined upon one end of the rear axle shaft 22. Each clutch element 56 is yieldably retained in interlocking engagement with corresponding clutch teeth formed on the face of the adjacent rear roller 20, so that both rear rollers are normally locked to the rear axle shaft 22 so as to rotate therewith. In this instance, this normal closed condition of the clutches is effected by the provision of coiled compression springs 57 each disposed within one of the forward bracket arms 29. As shown in Figure 5, each spring 57 bears at one end against a sleeve 58 retained in fixed position within the arm 29 by a stud 59, and at the other end bears outwardly against a movable sleeve 60 which in turn bears against the forward end of the lever 50 so as to yieldably maintain the lever in clutch engaging position.

The exact arrangement of the springs 56, levers 50, and the parts directly associated therewith, forms no part of the present invention, being covered by claims in the main case of which this a division.

During normal operation of the machine as an excavator or crane, the pinion 31 is normally in the upper position in mesh with the fixed rack 32 in which position swinging of the upper frame may be effected in the usual manner by rotation of the pinion. In order to utilize the swing mechanism for steering purposes, the head frame is first swung into such position that the pinion 31 is above the center of the segmental rack 39 and the pinion 31 then lowered out of mesh with the fixed rack 32 into mesh with the segmental rack. This is accomplished by depressing the link 46 and thereby forcing the lever 40 downwardly to the dotted line position indicated in Figure 2 in which position the tooth 45 on the lever 40 engages between the teeth of the fixed rack 32 to lock the head frame against rotation.

As above pointed out, the two clutches cooperating with the rear rollers 20 are normally in closed condition so that these rollers normally rotate in unison with the rear axle shaft 22, and this shaft being driven from the vertical propulsion shaft 16 causes a straight line travel of the machine. A turning movement of the machine is effected by rotation of the pinion 31 in mesh with the segmental rack 39. For instance, rotation of pinion 31 in a clockwise direction (Fig. 1) causes the segmental rack 39 and lever 34 to swing in a like direction. When this occurs, the pull rod 47 on the left side of the machine is drawn inwardly, the nut 51 thereon pressing the forward end of the lever 50 inwardly against the pressure of spring 57 and causing the rear end of this lever to swing outwardly so as to withdraw the clutch element 56 out of engagement with the clutch teeth on the corresponding roller 20. In this condition of the parts, this roller is released from driving engagement with the shaft and a driving force is applied to the roller 20 on the right side of the machine only. This obviously results in a turning movement of the machine toward the left. A turning movement in the other direction is similarly effected by a rotation of the pinion 31 in the opposite direction.

Figures 3 and 4 illustrate a similar type of steering mechanism applied to a power excavator mounted on wheels. The truck frame of this machine is constructed in substantially the same manner as that hereinabove described. In this instance, however, the front wheels 18′ are journaled upon the ends of an axle 19′ rockably mounted between the bifurcations 63′ of a vertical king pin 63. The pin 63 is journaled in a rigid mounting 64 extending transversely between and rigidly secured at its opposite ends to a pair of plates 65. Plates 65 are secured at their opposite ends to and between the forward transverse bar 11 and the adjacent intermediate transverse bar 12. The rear driving wheels 20′ are keyed to the opposite ends of the rear axle shaft 22″, journaled beneath the longitudinal sills 10 of the truck frame and driven from the vertical propulsion shaft 16 through the intermediate shaft 24 and appropriate gearing.

The swing pinion 31 is splined upon and driven by the shaft 33 so as to be vertically shiftable from in mesh with the fixed rack 32 into mesh with a segmental rack 39′ carried by the lever 34′. The position of elevation of this pinion is manually controlled in the manner hereinabove pointed out by the link 46 and lever 40, lever 40 having the finger 45 engageable between the teeth of the fixed rack 32 when in lower position to lock the head frame 14 against rotation.

The steering lever 34′ is mounted at its rear end to swing about a vertical pivot pin 36 mounted in a fixed bracket plate 38 in the manner above described. In this instance, however, a laterally extending crank arm 66 is rigidly secured to the pivoted end of the lever 34′ to swing therewith. This crank arm is operatively connected to the front axle 19′ through a heavy link 67. The arrangement is such that when the lever 34′ is swung in either direction from a neutral intermediate position, the front axle 19′ is swung about the axis of the king pin 63 for steering purposes.

Manual steering may thus be effected by the use of a bar 62 insertable in the hollow boss 61 carried by the lever 34′. For power steering, however, the pinion 31 is lowered into mesh with the segmental rack 39′ so that the lever 34′, and consequently the front axle, may be swung in response to rotation of this pinion.

Provision is preferably made for automatically locking the front axle against horizontal swinging during normal operation of the machine. For this purpose, trip dog 68 is provided pivoted intermediate its ends upon the upper forward end of lever 34′. One end of this dog is provided with a tooth 69 engageable in appropriate groove 70 found in the top face of the mounting 64 so as to releasably lock the lever 34′ against swinging. The other end 71 of dog 68 is fashioned to project into the path of vertical movement of the pinion 31. A spring 72 yieldably maintains the dog 68 in locking engagement when the pinion 31 is in upper position in mesh with the rack 32. The pinion 31, however, in its downward movement into mesh with the segmental rack 39′ depresses the end 71 of the dog and rocks the dog into released position.

Various changes may be made in any of the several embodiments of the invention hereinabove described, without departing from or sacrificing any of the advantages of the invention as defined in the appended claims.

I claim:

1. In a machine of the character described, the combination of: a base frame; a head frame supported thereby and rotatable with respect thereto; traction means supporting said base frame; steering mechanism; means for actuating said steering mechanism; a rack carried by the base frame; a pinion depending from the head frame and directly engaging said rack, whereby to rotate the head frame relative to the base frame; and one means whereby the rotation of said pinion, although said rotation is continuous, can be rendered inoperative to effect the rotation of the head frame and operative to operate, otherwise than by means passing through the axis of rotation of the head frame, the means for actuating the steering mechanism.

2. In a machine of the character described, the combination of: a base frame; a head frame supported thereby and rotatable with respect thereto; two creeping traction units supporting said base frame; power means; a clutch for each traction unit, operable to connect it to the power means; control means for the two clutches; a rack carried by the base frame; a pinion carried by the head frame, and rotatable by said power means; and means whereby the rotation of the pinion is selectively utilizable to rotate the head frame relative to the base frame, or to unclutch one clutch by the pinion's rotation in one direction, or the other clutch by the pinion's rotation in the other direction.

In testimony whereof I affix my signature.

SVANTE R. W. M. BAGER.